US007518552B2

(12) United States Patent
Heinz et al.

(10) Patent No.: US 7,518,552 B2
(45) Date of Patent: Apr. 14, 2009

(54) ANTENNA CONTROL SYSTEM

(75) Inventors: William Emil Heinz, Wellington (NZ); Mathias Martin Ernest Ehlen, Wellington (NZ)

(73) Assignee: Andrew Corporation, Westchester, IL (US)

( * ) Notice: Subject to any disclaimer, the term of this patent is extended or adjusted under 35 U.S.C. 154(b) by 18 days.

(21) Appl. No.: 11/366,794

(22) Filed: Mar. 2, 2006

(65) Prior Publication Data

US 2006/0170592 A1 Aug. 3, 2006

Related U.S. Application Data

(63) Continuation of application No. 10/025,155, filed on Dec. 18, 2001, which is a continuation of application No. 09/713,614, filed on Nov. 15, 2000, now Pat. No. 6,346,924, which is a continuation of application No. 08/817,445, filed on Apr. 30, 1997, now Pat. No. 6,198, 458.

(30) Foreign Application Priority Data

Nov. 4, 1994 (NZ) ..................................... 264864
Aug. 15, 1995 (NZ) ..................................... 272778
Oct. 16, 1995 (WO) .................... PCT/NZ95/00106

(51) Int. Cl.
*H01Q 3/00* (2006.01)
*H04M 1/00* (2006.01)

(52) U.S. Cl. ...................................... 342/372; 342/359

(58) Field of Classification Search .................. 342/74, 342/359, 372; 343/763, 766; 455/562.1
See application file for complete search history.

(56) References Cited

U.S. PATENT DOCUMENTS 5,621,752 A * 4/1997 Antonio et al. ............. 375/144
5,771,017 A * 6/1998 Dean et al. .................. 342/374

OTHER PUBLICATIONS

Peter Strickland, Ph.D., and Farel Bacchus, Microstrip Base Station Antennas for Cellular Communications, IEEE, 1991, p. 166-171, CH2944-7/91/0000/0166.
CEL-901 Cellular Antenna Controller User's Manual, 1991, p. i-B-1, CAL-MN-0566-10014, CAL Corporation, Ottowa, Ontario, Canada.

* cited by examiner

*Primary Examiner*—Dao L Phan
(74) *Attorney, Agent, or Firm*—Husch Blackwell Sanders LLP Welsh & Katz

(57) ABSTRACT

A cellular base station telecommunication system includes a plurality of base station antenna sites, each site having one or more groups of base station antennas. A central controller is configured to control an electrical or mechanical parameter in one or more of the antennas in the groups of antennas.

18 Claims, 9 Drawing Sheets

ANTENNA CONTROL SYSTEM

CROSS-REFERENCE TO RELATED APPLICATIONS

This is a continuation of application Ser. No. 10/025,155, filed Dec. 18, 2001, currently pending, which is a continuation of application Ser. No. 09/713,614, filed Nov. 15, 2000, now U.S. Pat. No. 6,346,924 B1, which is a continuation of application Ser. No. 08/817,445, having a PCT International filing date of Oct. 16, 1995 and a 35 U.S.C. § 371 filing date of Apr. 30, 1997, now U.S. Pat. No. 6,198,458 B1, wherein all applications are entitled Antenna Control System.

THE TECHNICAL FIELD

The present invention relates to an antenna control system for varying the beam tilt of one or more antenna. More particularly, although not exclusively, the present invention relates to a drive system for use in an antenna which incorporates one or more phase shifter.

BACKGROUND OF THE INVENTION

In order to produce downtilt in the beam produced by an antenna array (for example a panel antenna) it is possible to either mechanically tilt the panel antenna or electrically steer the beam radiated from the panel antenna according to techniques known in the art.

Panel antennas, such as those to which the present application is concerned, are often located on the sides of buildings or similar structures. Mechanical tilting of the antenna away from the side of the building increases the susceptibility of the installation to wind induced vibration and can impact on the visual environment in situations where significant amounts of downtilt are required.

In order to avoid the above difficulties, electrical beam steering can be effected by introducing phase delays into the signal input into radiating elements or groups of radiating elements in an antenna array.

Such techniques are described in New Zealand Patent Specification No. 235010.

Various phase delay techniques are known, including inserting variable length delay lines into the network feeding to the radiating element or elements, or using PIN diodes to vary the phase of a signal transmitted through the feeder network.

A further means for varying the phase of two signals is described in PCT/NZ94/00107 whose disclosure is incorporated herein by reference. This specification describes a mechanically operated variable differential phase shifter incorporating one input and two outputs.

For the present purposes it is sufficient to note that phase shifters such as those described in PCT/NZ94/00107 are adjusted mechanically by sliding an external sleeve along the body of the phase shifter which alters the relative phase of the signals at the phase shifter outputs.

A typical panel antenna will incorporate one or more phase shifters and the present particular embodiment includes three phase shifters. A signal is input to the primary phase shifter which splits the signal into two signals having a desired phase relationship. Each phase shifted signal is then input into a secondary phase shifter whose outputs feeds at least one radiating element. In this manner a progressive phase shift can be achieved across the entire radiating element array, thus providing a means for electrically adjusting the downtilt of the radiated beam. Other phase distributions are possible depending on the application and shape of the radiated beam.

While the steering action is discussed in the context of downtilt of the radiated beam, it is to be understood that the present detailed description is not limited to such a direction. Beam tilt may be produced in any desired direction.

Another particular feature of the variable differential phase shifters is that they provide a continuous phase adjustment, in contrast with the more conventional stepped phase adjustments normally found in PIN diode or stepped length delay line phase shifters.

In a panel antenna of the type presently under consideration, it is desirable to adjust the entire phase shifter array simultaneously so that a desired degree of beam tilt may be set by the adjustment of a single mechanical setting means. The mechanical drive which performs such an adjustment must result in reproducible downtilt angles and be able to be adapted to provide for a number of different phase shifter array configurations.

It is also desirable that the beam tilt of an antenna may be varied remotely to avoid the need for personnel to climb a structure to adjust antenna beam tilt.

DISCLOSURE OF THE INVENTION

It is an object of the present invention to provide a mechanical drive system for use in adjusting mechanical phase shifters which mitigates the abovementioned difficulties, provides a solution to the design requirements of the antennas or antenna arrays described above, or at least provides the public with a useful choice.

Accordingly, there is provided a mechanical adjustment means for adjusting the relative phase shifts produced by a plurality of phase shifters connected to an array of radiating elements, said mechanical adjustment means including:

first means for moving a first portion of a first phase shifter relative to a second portion of said first phase shifter to vary the phase difference between output signals from the first phase shifter; and second means for moving a first portion of a second phase shifter relative to a second portion of said second phase shifter to vary the phase difference between output signals from the second phase shifter, wherein the second phase shifter is fed from an output of the first phase shifter and the degree of movement of the second means is dependent upon the degree of movement of the first means.

Preferably, movement of the second means results in simultaneous movement of a first portion of a third phase shifter with respect to a second portion of the third phase shifter wherein the third phase shifter is fed from an output of the first phase shifter.

Preferably the outputs of the second and third phase shifters are connected to radiating elements so as to produce a beam which tilts as the first and second means adjusts the phase shifters.

Preferably the movement of the first portion of the first phase shifter a first distance relative to the second portion of the first phase shifter results in relative movement between first portions of the second and third phase shifters relative to second portions of the second and third phase shifters of about twice the first distance.

According to a first preferred embodiment the first means includes a gear wheel which drives a rack connected to a first portion of the first phase shifter, arranged so that rotation of the first gear wheel causes the first portion of the first phase shifter to move relative to the second portion of the first phase shifter. Preferably, the second portion of the first phase shifter is mounted to a carriage and the outputs of the first phase shifter are connected to inputs of the second and third phase shifters by push rods so that movement of the second portion of the first phase shifter moves the first portions of the second and third phase shifters with respect to the second portions of the second and third phase shifters.

Preferably a second gear is provided co-axial with and connected to a shaft driving the first gear which drives a rack connected to the second part of the first phase shifter so that rotation of the second gear causes movement of the first portion of the second and third phase shifters relative to the second portions of the second and third phase shifters.

Preferably the ratio between the first and second gear wheels is about 3:1.

According to a second embodiment of the present invention the adjustment means includes a shaft and said first means includes a first threaded portion provided on said shaft and a first cooperating threaded member connected to the first portion of the first phase shifter. The second means includes a second threaded portion provided on said shaft and a second cooperating threaded member connected to the first portion of the second phase shifter. The arrangement is such that rotation of the shaft causes the first portion of the first phase shifter to move relative to the second portion of the first phase shifter at a rate of about twice that of the movement of the first portion of the second phase shifter relative to the second portion of the second phase shifter.

Preferably the second threaded member is connected to the second portion of the first phase shifter and moves the first portion of the second phase shifter via a push rod. This push rod is preferably a coaxial line connecting an output from the first phase shifter to the input to the second phase shifters Preferably there is further provided a third phase shifter fed from a second output of the first phase shifter via a push rod which moves a first portion of the third phase shifter in unison with the first portion of the second phase shifter.

According to a further aspect of the invention there is provided an antenna system comprising one or more antenna including electromechanical means for varying the downtilt of the antenna and a controller, external to the antenna, for supplying drive signals to the electromechanical means for adjusting downtilt.

Preferably the system includes a plurality of antennas and the controller may adjust the downtilt for the plurality of antennas and store the degree of downtilt of each antenna in memory.

Preferably the controller may be controlled remotely from a control centre so that a plurality of such systems may be remotely controlled as part of a control strategy for a number of cellular base stations.

Preferably the electromechanical means varies the electrical downtilt of each antenna and means are included for monitoring the electromechanical means and providing signals representative of the position of the electromechanical means to the controller.

BRIEF DESCRIPTIONS OF THE DRAWINGS

Embodiments of the invention will now be described by way of example with reference to the accompanying drawings in which.

BEST MODE FOR CARRYING OUT THE INVENTION

Figure 1:
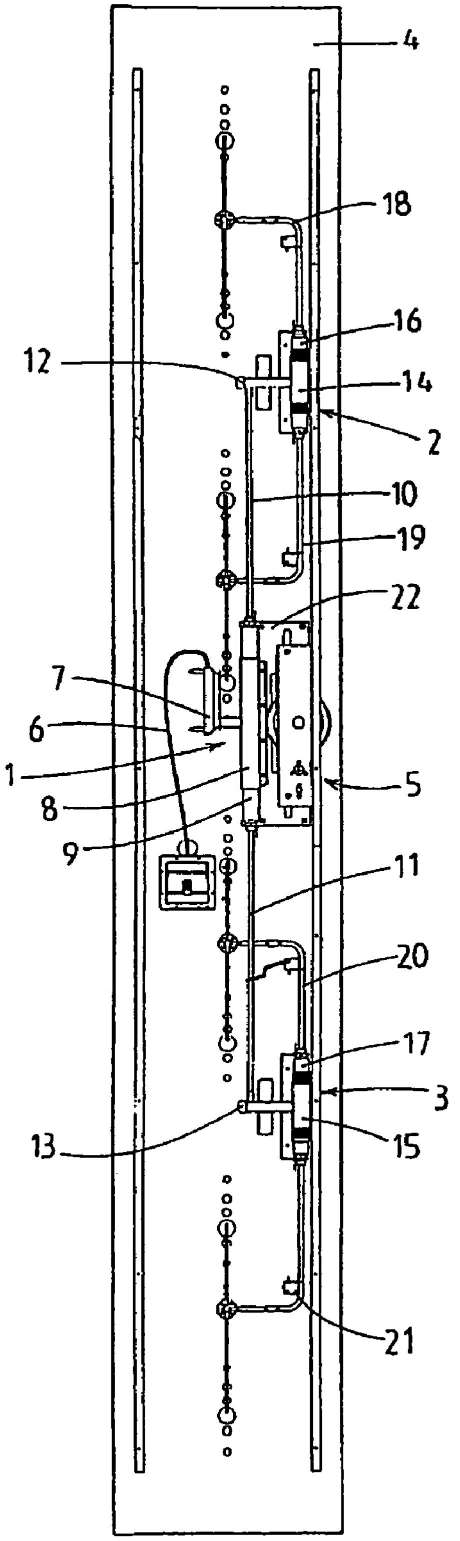
FIG. 1 shows a panel antenna incorporating a phase shifter drive mechanism according to a first embodiment of the invention.

Referring to FIG. 1 there is shown the back side of a panel antenna 4 having a first phase shifter 1, a second phase shifter 2, a third phase shifter 3 and a phase shifter drive mechanism 5. Feed line 6 is connected to input 7 of phase shifter 1. A first portion 8 of phase shifter 1 is moveable relative to a second portion 9 of phase shifter 1.

Output signals from phase shifter 1 are supplied via lines 10 and 11 to inputs 12 and 13 of phase shifters 2 and 3 respectively. Feed lines 10 and 11 comprise coaxial push rods which serve the functions both of feeding signals from the outputs of phase shifter 1 to phase shifters 2 and 3 and moving first portions 14 and 15 of phase shifters 2 and 3 relative to second portion 16 and 17 of phase shifters 2 and 3 respectively.

Signals output from phase shifters 2 and 3 are supplied via coaxial lines 18, 19, 20 and 21 to be fed to respective radiating elements (not shown).

In use first portion 8 of phase shifter 1 may be moved relative to second portion 9 of phase shifter 1 to change the relative phase of signals supplied via lines 10 and 11 to phase shifters 2 and 3 respectively. First portions 14 and 15 of phase shifters 2 and 3 may be moved relative to second portions 16 and 17 of phase shifters 2 and 3 to vary the phase of signals supplied by lines 18, 19, 20 and 21 to respective radiating elements.

When phase shifters 1, 2 and 3 are adjusted in the correct respective portions the beam emitted by the antenna can be tilted as required. It will be appreciated that where a less defined beam is required fewer phase shifters may be employed.

To achieve even continuous beam tilting for the embodiment shown in FIG. 1 the first portions 14 and 15 of phase shifters 2 and 3 should move relative to the second portion 16 and 17 of phase shifters 2 and 3 at the same rate. The first portion 8 of phase shifter 1 must however move relative to the second portion 9 of phase shifter 1 at twice this rate. In the arrangement shown second portion 9 of phase shifter 1 is connected to carriage 22. Movement of carriage 22 results in movement of first portions 14 and 15 of phase shifters 2 and 3 via push rods 10 and 11.

Figure 4:
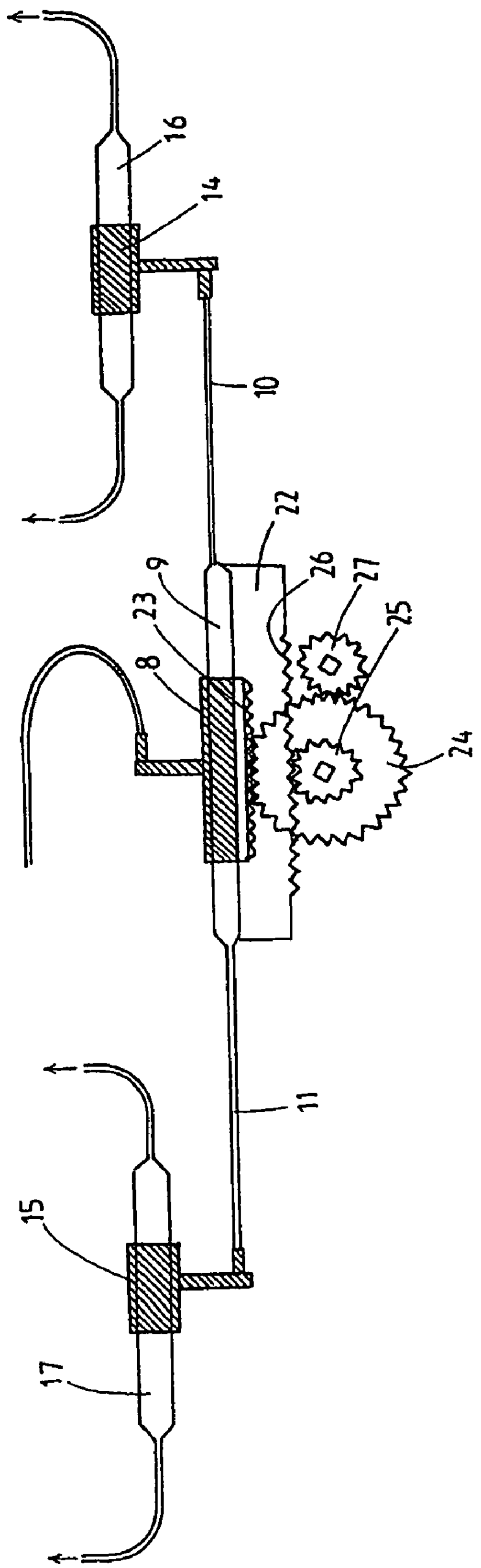
FIG. 4 shows diagrammatically the operation of the drive mechanism according to the first embodiment.

Referring now to FIG. 4, operation of the phase shifter drive mechanism will be explained. Second portion 9 of phase shifter 1 is mounted to a carriage 22 which can move left and right. If carriage 22 is moved to the left first portions 14 and 15 of phase shifters 2 and 3 will be moved to the left via push rods 10 and 11. First portion 8 of phase shifter 1 may be moved relative to second portion 9 of phase shifter 1 to vary the phase of signal supplied to phase shifters 2 and 3.

According to this first embodiment a rack 23 is secured to first portion 8 of phase shifter 1. Upon rotation of gear wheel 24 first portion 8 of phase shifter 1 may be moved to the left or the right. A smaller gear wheel 25 is secured to and rotates with gear wheel 24. This gear wheel engages with a rack 26 provided on carriage 22. A further gear wheel 27 is provided which may be driven to rotate gear wheels 24 and 25 simultaneously.

Gear wheel 24 has 90 teeth whereas gear wheel 25 has 30 teeth. It will therefore be appreciated that rotation of gear wheel 24 results in first portion 8 of phase shifter 1 being moved three times as far as carriage 22 (and hence first portions 14 and 15 of phase shifters 2 and 3). However, as carriage 22 is moving in the same direction as the first portion 8 of phase shifter 1 it will be appreciated that the relative movement between first portion 8 and second portion 9 of phase shifter 1 is twice that of the relative movement between the first and second portions of phase shifters 2 and 3. Accordingly, this arrangement results in the relative phase shift produced by phase shifter 1 being twice that produced by phase shifters 2 and 3 (as required to produce even beam tilting in a branched feed arrangement).

Figure 2:
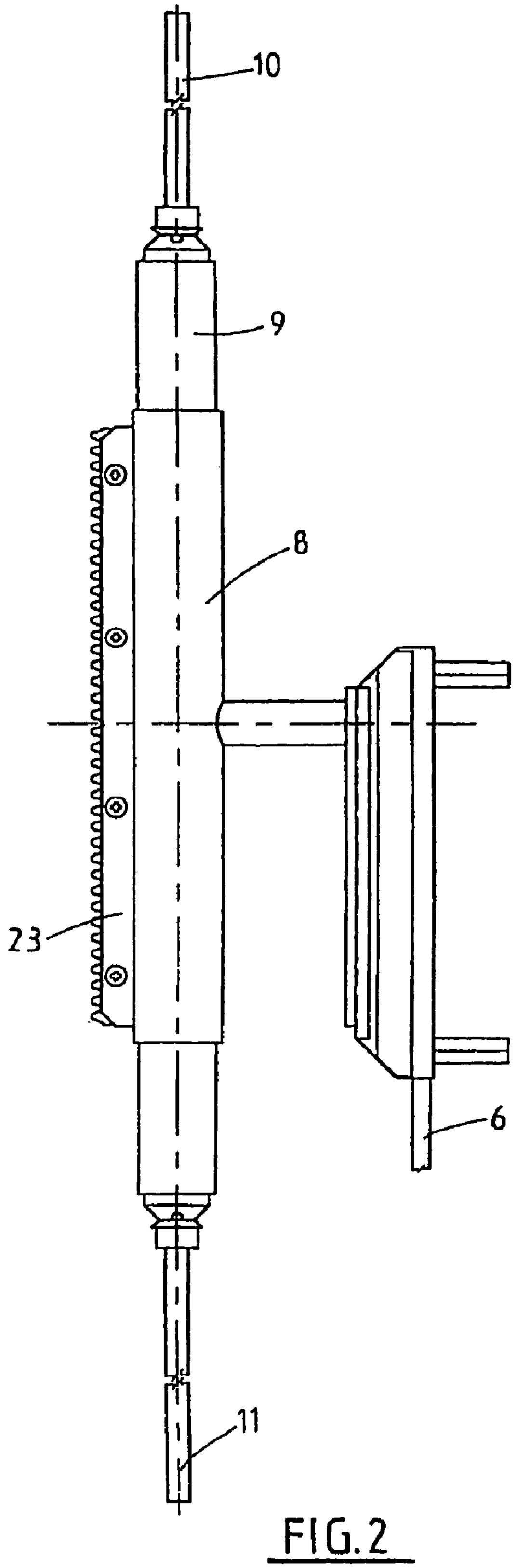
FIG. 2 illustrates a primary phase shifter incorporating a gear rack.
Figure 3:
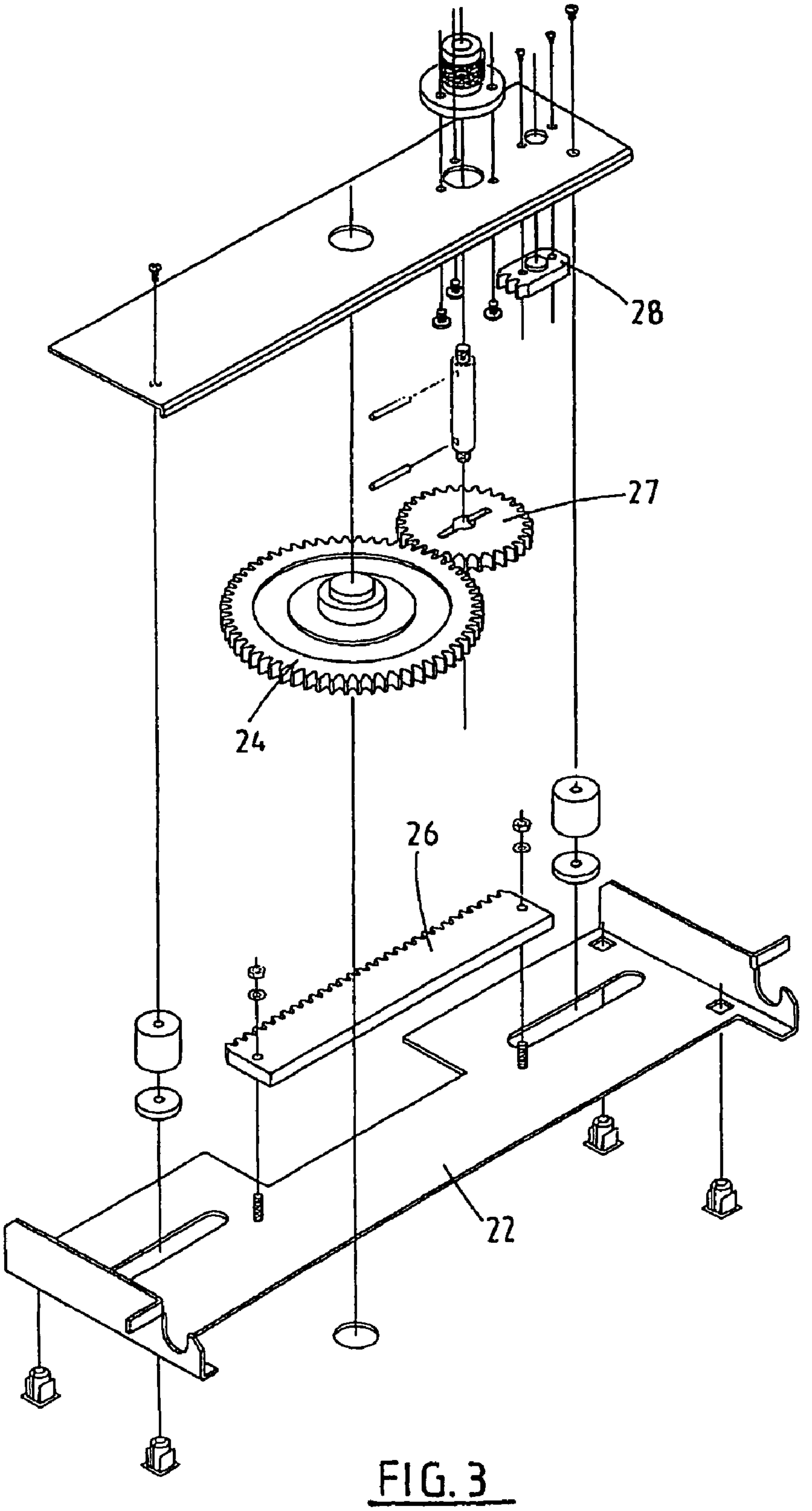
FIG. 3 illustrates an exploded view of the adjustment assembly incorporated into the carnage.

The particular arrangement is shown in more detail in FIGS. 2 to 4. It will be appreciated that gear wheel 27 may be driven by any appropriate manual or driven means. Gear wheel 27 may be adjusted by a knob, lever, stepper motor or other driven actuator. A keeper 28 may be secured in place to prevent movement once the desired settings of the phase shifters have been achieved.

Figure 5:
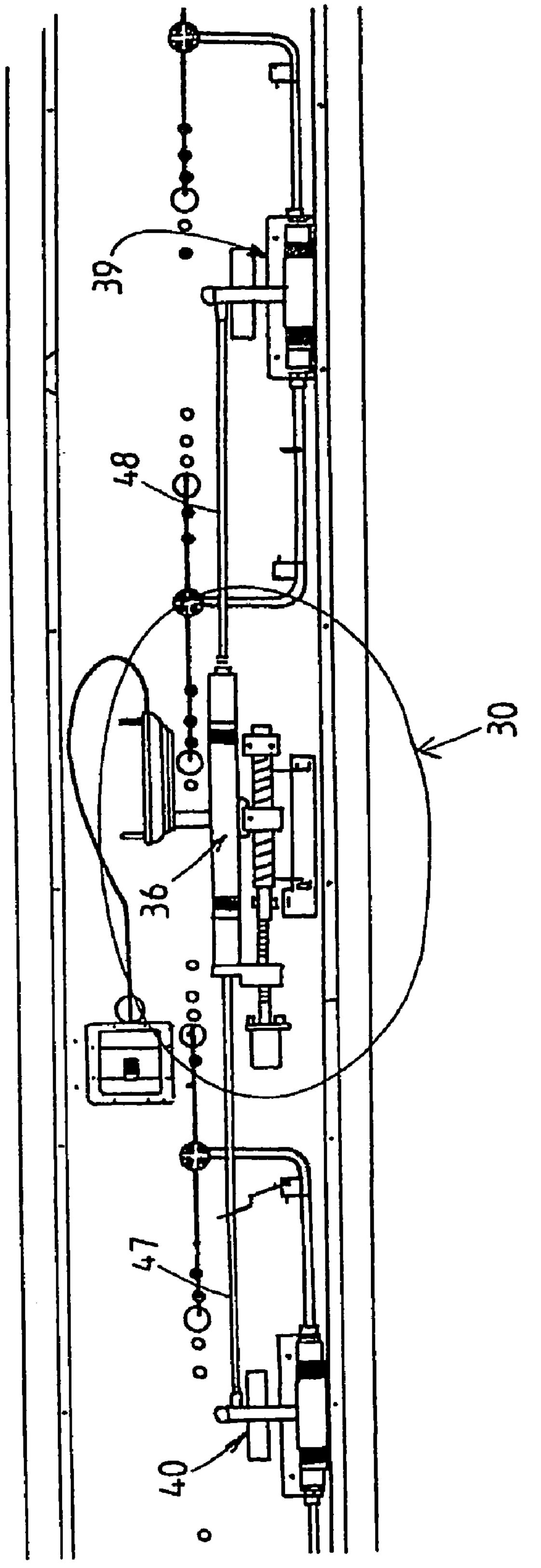
FIG. 5 shows a panel antenna incorporating a phase shifter drive mechanism according to a second embodiment of the invention.
Figure 6:
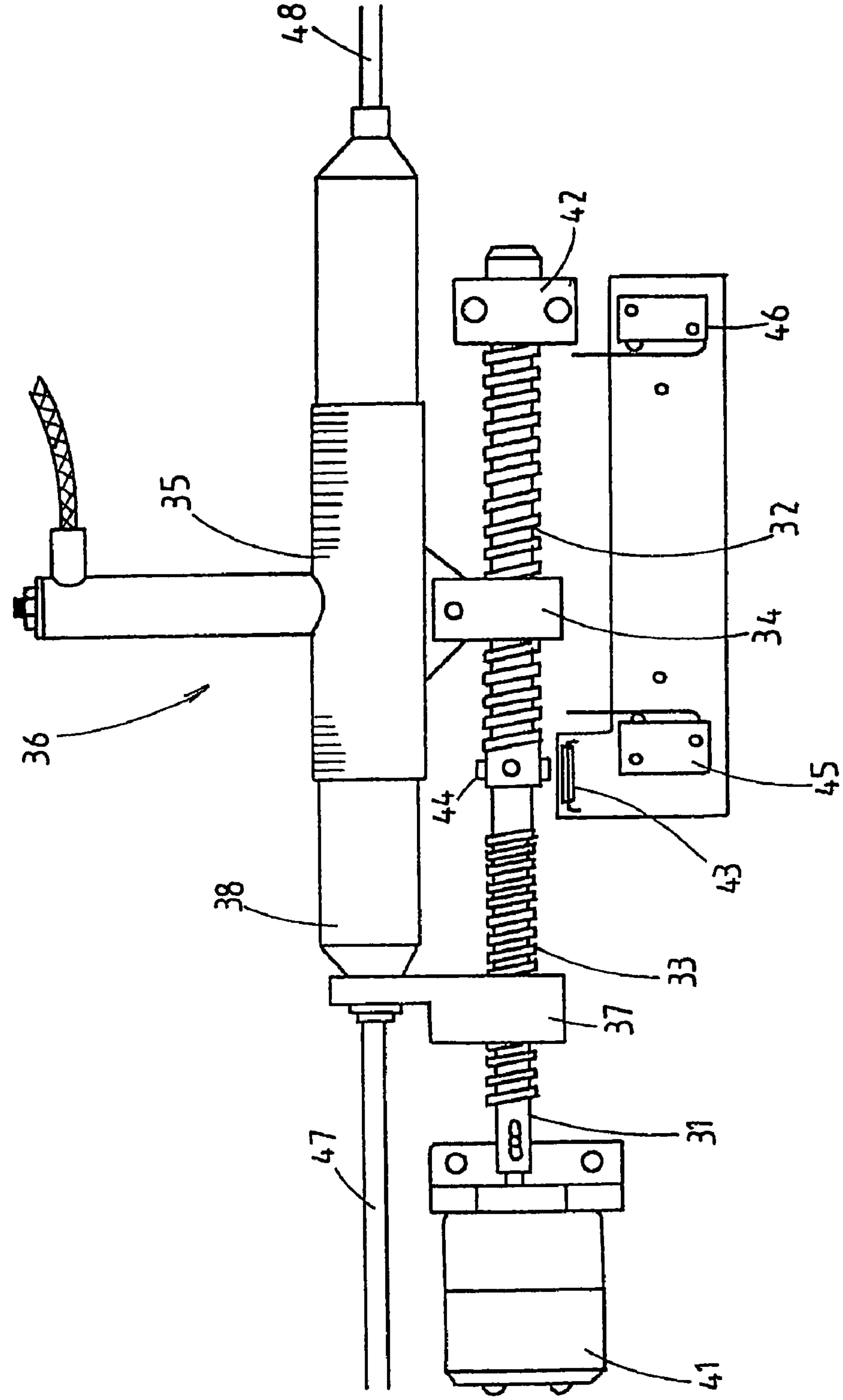
FIG. 6 shows the phase shifter drive mechanism of FIG. 5 in detail.

Referring now to FIGS. 5 and 6, a second embodiment will be described. As seen in FIG. 5, the arrangement is substantially the same as that shown in the first embodiment except for the drive mechanism 30 employed, which is shown in FIG. 6.

In this embodiment the drive mechanism includes a shaft 31 having a first threaded portion 32 and a second threaded portion 33 provided thereon. A first threaded member 34 is connected to a first portion 35 of primary phase shifter 36. A second threaded member 37 is connected to the second portion 38 of primary phase shifter 36.

First threaded portion 32 is of three times the pitch of second threaded portion 33 (e.g. the pitch of the first threaded portion 32 is 6 mm whereas the pitch of the second threaded portion is 2 mm). In this way, first portion 35 is driven in the direction of movement at three times that of second portion 38. In this way the phase shift produced by primary phase shifter 36 is twice that of second and third phase shifters 39 and 40.

Shaft 31 is rotated by motor 41. This may suitably be a geared down 12 volt DC motor. The other end of shaft 31 is supported by end bearing 42. A reed switch 43 is provided to detect when magnets 44 pass thereby. In this way the number of rotations of shaft 31 may be monitored. Limit switches 45 and 46 may be provided so that the motor is prevented from further driving shaft 31 in a given direction if threaded member 34 abuts a lever of limit switch 45 or 46 respectively.

Operation of the drive means according to the second embodiment will now be described by way of example. Motor 41 may rotate shaft 31 in an anticlockwise direction, viewed from right to left along shaft 31. Threaded member 37 is driven by second threaded portion 33 to move push rods 47 and 48 to the left, and thus to adjust phase shifters 39 and 40.

Threaded member 34 is driven to the left at three times the rate of threaded member 37. First portion 35 thus moves to the left at three times the rate of second portion 38. First portion 35 therefore moves relative to second portion 38 at twice the speed the first portions of phase shifters 39 and 40 move relative to their respective second portions. In this way, delays are introduced in the paths to respective radiating elements so as to produce an evenly tilting beam.

The conductivity of reed switch 43 is monitored so that the number of rotations, or part rotations, of shaft 31 may be monitored. If the motor continues driving shaft 31 until threaded member 34 abuts the lever of limit switch 45 then logic circuitry will only permit motor 41 to drive in the opposite direction. Likewise if threaded member 34 abuts the lever of limit switch 46 the motor 41 will only be permitted to drive in the opposite direction.

It will be appreciated that the techniques of both embodiments could be employed in antenna arrays using a larger number of phase shifters. In such applications the relative movement of the first portion of each phase shifter relative to the second portion of each phase shifter would decreased by a factor of 2 for each successive phase shifter along each branch. The ratios used may be varied if the radiation pattern of the antenna needs to be altered to account for the directivity of the individual radiating elements and the effect of the back panel as the amount of downtilt is varied.

Components of the drive mechanism 30 are preferably formed of plastics, where possible, to reduce intermodulation. Threaded members 34 and 37 preferably include plastic links to phase shifter 36 to reduce intermodulation.

It will be appreciated that a number of mechanical drive arrangements may be used to achieve adjustment of the phase shifters in the desired ratio. It is also to be appreciated that sophisticated control electronics may be employed, although the simplicity of construction of the present invention is seen as an advantage.

Figure 7:
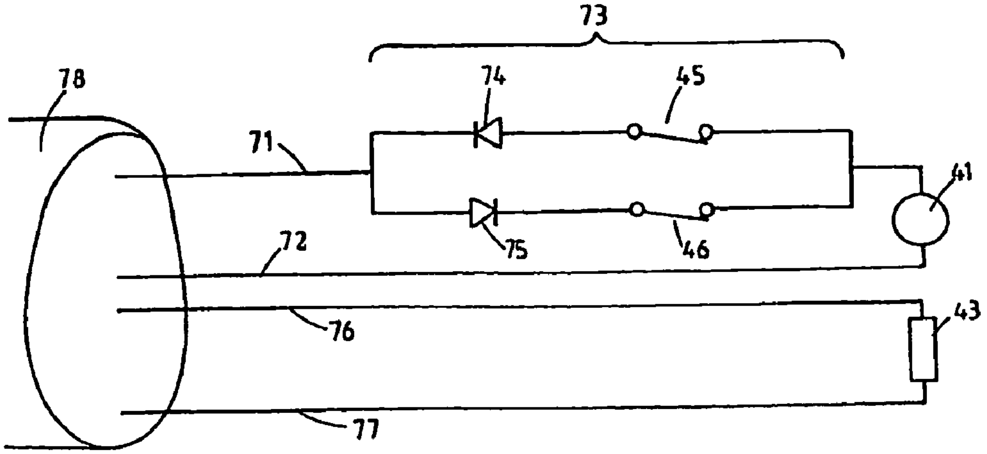
FIG. 7 shows the electrical connection of the motor, switches and reed switch of the drive mechanism shown in FIG. 6.

FIG. 7 shows how motor 41, reed switch 43 and switches 45 and 46 are connected to lines 71, 72, 76 and 77 from an external controller. Lines 71, 72, 76 and 77 are sheathed by conduit 78. Lines. 71 and 72 supply current to drive motor 41. Section 73 ensures that if threaded member 34 is driven to either the left-hand side limit or the right-hand side limit it can only be driven in the opposite direction. In the position shown in FIG. 7, switch 45 directly connects line 71 to switch 46 via diode 74. In the position shown switch 46 connects line 71 to motor 41 via diode 75. This is the normal position of the switches when threaded member 34 is not at either extreme limit. When threaded member 34 is driven to the extreme left, for example, and actuates switch 45, then switch 45 open circuits the path via diode 74. Diode 74 allows current flow in the direction allowing motor 41 to drive to the left. Accordingly, when switch 45 is open, motor 41 can only drive in such a direction as to drive threaded member 34 to the right (i.e.: current in the direction allowed by diode 75).

Likewise, if threaded member 34 is driven to the extreme right, switch 46 is opened to break the path via diode 75. This prevents motor 41 driving in such a direction as to drive threaded member 34 further to the right.

Lines 76 and 77 are connected to reed switch 43 so that the opening and closing of reed switch 43 may be monitored by an external control unit. In use, the opening and closing of reed switch 43 may be monitored to determine the position of threaded member 34, and hence the corresponding degree of tilt of the antenna.

To select an initial angle of downtilt threaded member 34 may be driven to the extreme right. An external controller may provide a current in one direction to motor 41 to drive member 34 to the right. The motor will continue to be driven to the right until threaded portion 34 abuts switch 46. When switch 46 is opened diode 75 will be open circuited, which will prevent the motor being driven further to the right.

The controller will sense that threaded member 34 is at its extreme right position as it will detect that reed switch 43 is not opening and closing. After a predetermined delay the controller may then provide a current in the opposite direction via lines 71 and 72 to motor 41 to drive it to the left. As the motor is driven to the left the controller will monitor the opening and closing of reed switch 43 to determine how far threaded member 34 has moved to the left. The controller will continue to move threaded member 34 to the left until reed switch 43 has opened and closed a predetermined number of times, corresponding to a desired angle of downtilt. Alternatively, threaded member 34 may be driven to the extreme left and then back to the right.

Figure 8:
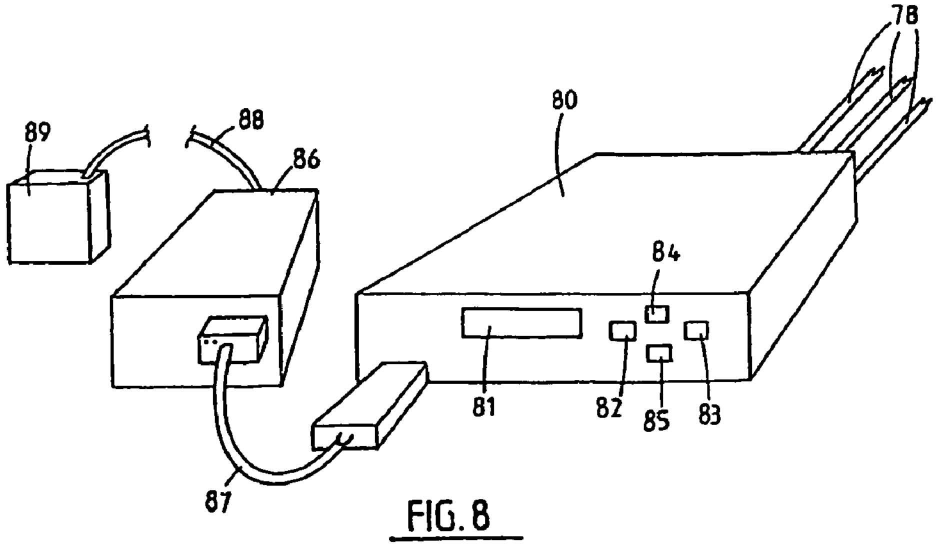
FIG. 8 shows a controller for controlling the drive mechanism shown in FIGS. 6 and 7.
Figure 9:
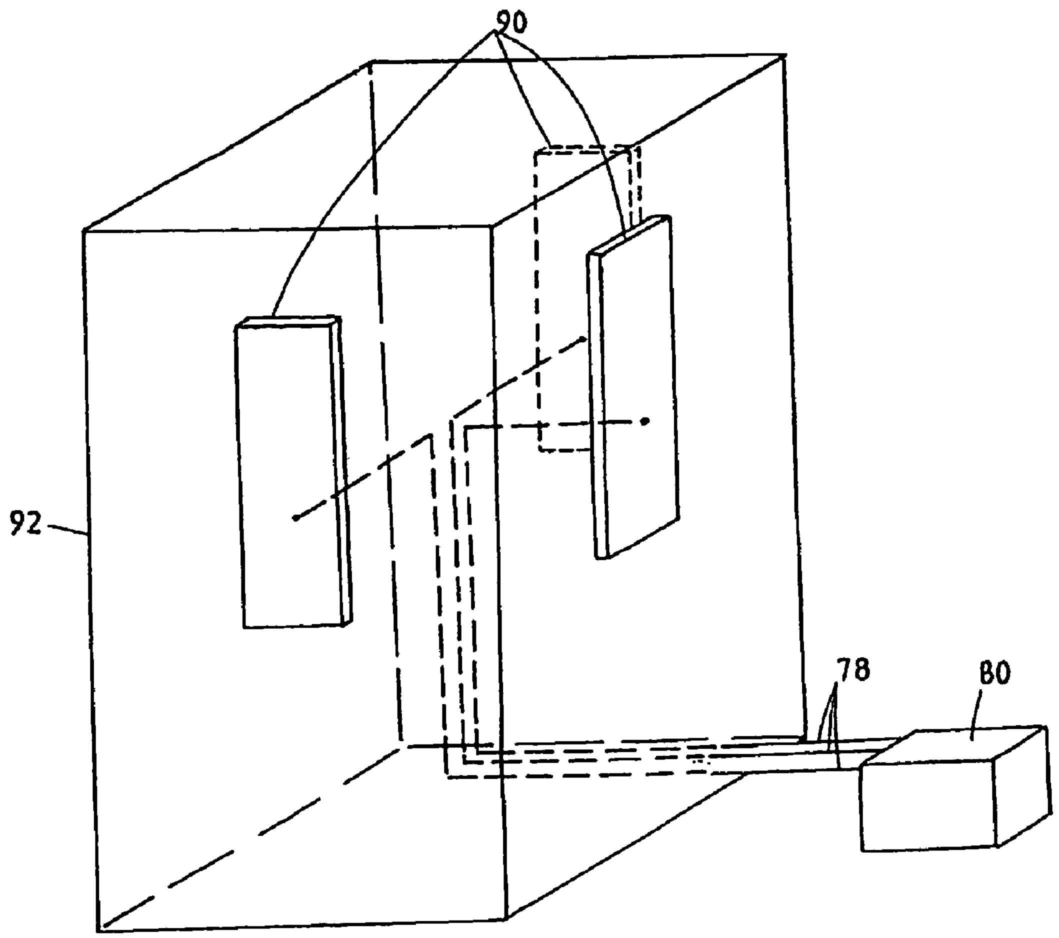
FIG. 9 shows an antenna system according to one aspect of the present invention having a plurality of antennas controlled by a controller.
Figure 10:
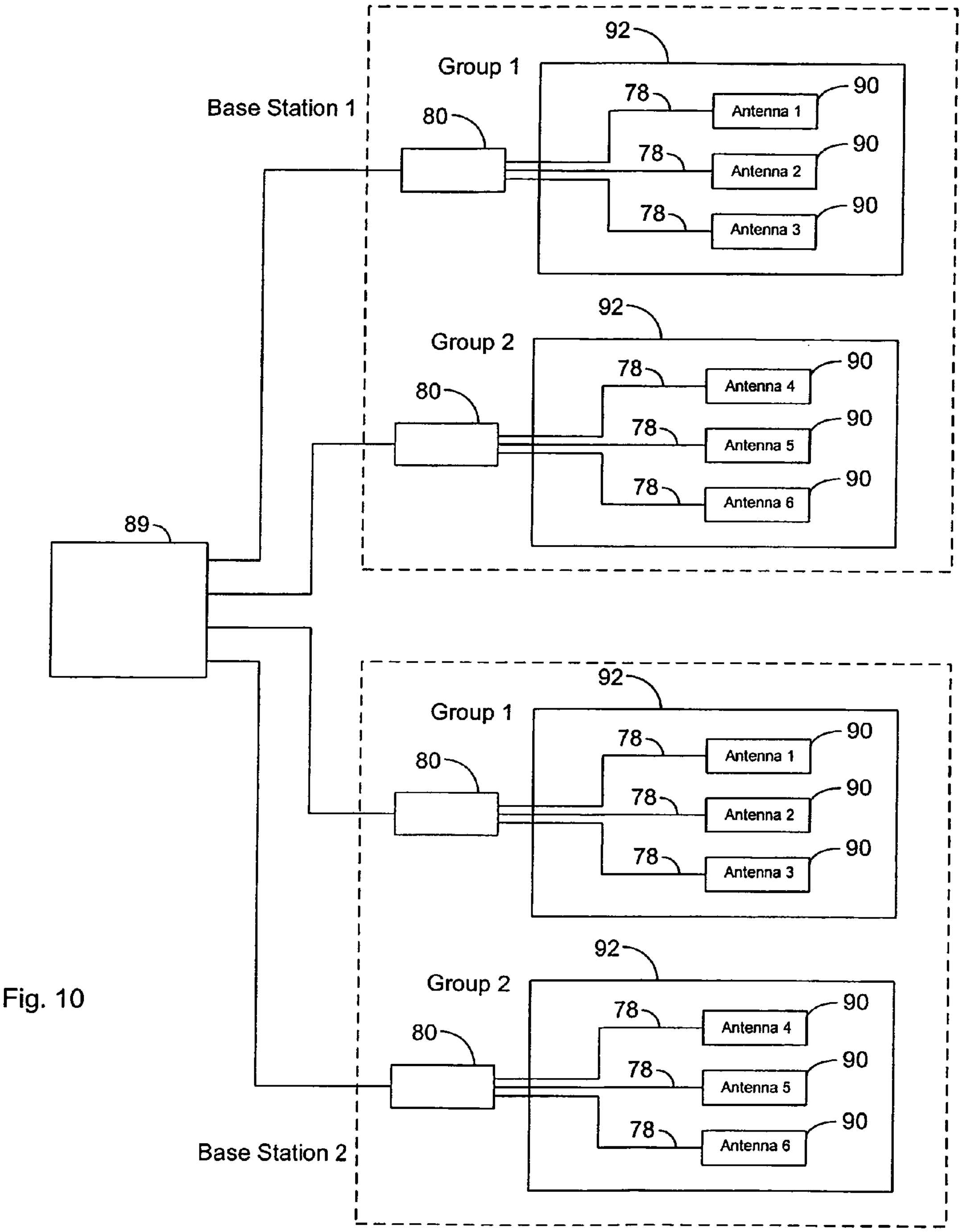
FIG. 10 shows a plurality of antenna systems as shown in FIG. 9 controlled by a central controller.

As shown in FIG. 9, at an antenna site a number of such panels 90 may be installed and controlled by a single controller 80 as shown in FIG. 8. The four wires 71, 72, 76 and 77 correspond to respective cable groups 78 to three such antenna panels. Controller 80 may be provided at the base of an antenna site to allow an operator to adjust the tilt of a plurality of antennas at ground level, rather than requiring a serviceman to climb up the antenna structure 92 and adjust each antenna manually. Alternatively, controller 80 may be a hand-held unit which can be plugged into a connector at the base of an antenna to adjust the antenna at a site.

Controller 80 may include a display 81, an "escape" button 82, an "enter" button 83, an "up" button 84 and "down" button 85. At power up display 81 may simply display a home menu such as "Deltec NZ Ltd© 1995". Upon pressing any key, a base menu may be displayed including options such as:

unlock controls
set array tilt
measure tilt
enable array
disable array
lock controls The up/down keys may be used to move through the menu and the enter key 83 used to select an option. If "unlock controls" is selected a user will then be required to enter a three digit code. The up/down keys may be used to move through the numbers 0 to 9 and enter used to select each number. If the correct code is entered "locked released" appears. If the incorrect code is entered "controls locked" appears and a user is returned to the home menu. If "set array tilt" is selected from the base menu the following may appear:

set array tilt
array:01 X.X°

The up-down keys 84, 85 may be used to select the desired array number. The enter key accepts the selected array and the previously recorded angle of downtilt may be displayed as follows:

set array tilt
array: 01 4.6°

In this example the previously set angle of downtilt with 4.60°. Using the up/down keys 84, 85 a new angle may be entered. Controller 80 may then provide a current to motor 41 via lines 71 and 72 to drive threaded portion 34 in the desired direction to alter the downtilt. The opening and closing of reed switch 43 is monitored so that threaded member 34 is moved in the desired direction for a predetermined number of pulses from reed switch 43. The downtilt for any other array may be changed in the same manner. If the controller is locked a user may view an angle of downtilt but will not be able to alter the angle.

If the "measure array" option is selected the present angle of downtilt of the antenna may be determined. Upon selecting the "measure tilt" function from the base menu, the following display appears:

measure tilt
array: 01 X.X°

The up/down buttons may be used to select the desired array. The enter key will accept the selected array. To measure the actual angle of downtilt controller 80 drives a motor 41 of an array to drive member 34 to the right. Motor 41 is driven until threaded member 34 abuts switch 46. The controller 80 counts the number of pulses from reed switch 43 to determine how far threaded portion 34 has travelled. At the extreme right position the controller 80 determines and displays the angle of downtilt, calculated in accordance with the number of pulses connected from reed switch 43. The controller 80 then drives threaded member 34 back in the opposite direction for the same number of pulses from reed switch 43 so that it returns to the same position. The angle of downtilt for each antenna may be stored in memory of controller 80. This value will be updated whenever the actual angle of downtilt is measured in this way. The "measure tilt" function may not be used if the controller is locked.

Controller 80 may include tables in memory containing the number of pulses from reed switch 43 that must be counted for threaded member 34 to achieve each desired degree of downtilt. This may be stored as a table containing the number of pulses for each required degree of downtilt, which may be in 0.1° steps. This approach ensures that any non-linearities of the antenna may be compensated for as the tables will give the actual amount of movement required to achieve a desired downtilt for a given antenna.

The "enable array" function may be used to enable each array when installed. The controller 80 will be prevented from moving any array that has not been enabled. Controller 80 will record in memory which arrays have been enabled. The "disable array" function may be used to disable arrays in a similar manner.

The "lock controls" function may be used to lock the controller once adjustment has been made. A "rack error" signal may be displayed if the array has not operated correctly. This will indicate that an operator should inspect the array.

Adjustment of the array may also be performed remotely. Controller 80 may be connected to modem 86 via serial line 87 which may connect via telephone line 88 to a central controller 89. Alternatively, the controller 80 may be connected to a central controller 89 via a radio link etc. The functions previously discussed may be effected remotely at central controller 89. In a computer controlled system adjustments may be made by a computer without operator intervention. In this way, the system can be integrated as part of a control strategy for a cellular base station. For example, a remote control centre 89 may adjust the downtilt of antennas at a cellular base station remotely to adjust the size of the cell in response to traffic demand. It will be appreciated that the capability to continuously and remotely control the electrical downtilt of a number of antenna of a cellular base station may be utilized in a number of control strategies.

Central controller 89 may be a computer, such as an IBM compatible PC running a windows based software program. A main screen of the program may show information regarding the antenna under control as follows:

| GROUP 1 | NAME | TYPE ANGLE | CURRENT VALUE | NEW | STATUS |
|---|---|---|---|---|---|
| antenna 1 | 1 south | VT01 | 12° | 12.5° | setting |
| antenna 2 | 1 north | VT01 | 12° | 12.5° | queued |
| antenna 3 | 1 west | VT01 | 12° | 12.5° | queued |

-continued

| GROUP 2 | NAME | TYPE | CURRENT ANGLE | NEW VALUE | STATUS |
|---|---|---|---|---|---|
| antenna 4 | 2 south | VT01 | 6° | | pending |
| antenna 5 | 2 north | VT01 | 6° | .5° | nudging |
| antenna 6 | 2 west | VT01 | 6° | | faulty |

The antennas may be arranged in groups at each site. Group 1 for example contains antennas 1, 2 and 3. The following information about each antenna is given:

Name: this is the user assigned name such as 1 south, 1 north, 1 west etc.

Type: this is the antenna type which the controller communicates to the PC at start-up.

Current Angle: this is the actual degree of beam tilt of an antenna which is communicated from the controller to the PC at start-up. The controller also supplies to the PC each antenna's minimum and maximum angles of tilt.

New Value: by moving a pointer to the row of an antenna and clicking a button of a mouse the settings of an antenna may be varied. When a user clicks on the mouse the following options may be selected:

- Name—the user may change the group or antenna name.
- Adjust—a user may enter a new angle in the "new value" column to set the antenna to a new value.
- Nudge—the user may enter a relative value (i.e.: increase or decrease the tilt of an antenna by a predetermined amount).
- Measure—the controller may be instructed to measure the actual angle of tilt of an antenna or group of antennas.

If an antenna is in a "fault" condition then it may not be adjusted and if a user clicks on a mouse when that antenna is highlighted a dialogue box will appear instructing the user to clear the fault before adjusting the antenna.

Each antenna also includes a field indicating the status of the antenna as follows:

O.K.—the antenna is functioning normally.

Queued—an instruction to read, measure, set or nudge the antenna has been queued until the controller is ready.

Reading—when information about an antenna is being read from the controller.

Measuring—when the actual degree of tilt of the antenna is being measured.

Setting—when a new tilt angle is being set.

Nudging—when the tilt angle of the antenna is being nudged.

Faulty—where an antenna is faulty.

When adjusting, measuring or nudging an antenna a further dialogue box may appear describing the action that has been instructed and asking a user to confirm that the action should be taken. This safeguards against undesired commands being carried out.

Information for a site may be stored in a file which can be recalled when the antenna is to be monitored or adjusted again. It will be appreciated that the software may be modified for any required control application.

Controller 80 may be a fixed controller installed in the base of an antenna site or could be a portable control unit which is plugged into connectors from control lines 78.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope or spirit of the present invention.

INDUSTRIAL APPLICABILITY

The present invention may find particular application in antenna systems, such as those used in cellular communication systems.

What is claimed is:

1. A cellular base station telecommunication system comprising:

a. at a first site, a first cellular base station comprising a first group of base station antennas controlled by a first local controller, each antenna having a controllable electrical or mechanical parameter, each antenna further having two or more radiating elements and an electromechanical structure responsive to externally supplied control signals and configured to effect relative movement of components of one or more phase shifting elements to vary the phase of signals supplied to the respective radiating elements to vary a direction of a beam of the antenna;

b. at a second site, a second cellular base station comprising a second group of base station antennas controlled by a second local controller; each antenna having a controllable electrical or mechanical parameter, each antenna further having two or more radiating elements and an electromechanical structure responsive to externally supplied control signals and configured to effect relative movement of components of one or more phase shifting elements to vary the phase of signals supplied to the respective radiating elements to vary a direction of a beam of the antenna; and c. a central controller communicating with said first and second local controllers and configured to control said parameter in one or more of the antennas of said groups of antennas.

2. A cellular base station telecommunication system comprising:

a. at a first site, a first cellular base station comprising a first group of base station antennas controlled by a first local controller, each antenna having two or more radiating elements and an electromechanical structure responsive to externally supplied control signals and configured to effect relative movement of components of one or more phase shifting elements to vary the phase of signals supplied to the respective radiating elements to vary a direction of a beam of the antenna;

b. at a second site, a second cellular base station comprising a second group of base station antennas controlled by a second local controller; each antenna having two or more radiating elements and an electromechanical structure responsive to externally supplied control signals and configured to effect relative movement of components of one or more phase shifting elements to vary the phase of signals supplied to the respective radiating elements to vary a direction of a beam of the antenna; and c. a central controller communicating with said first and second local controllers and configured to monitor, sense, or read a predetermined base station equipment status, setting state or condition.

3. The cellular base station communication system of claim 2 wherein said central controller includes a memory and is configured to store in, recall from, or update said memory with data developed concerning said equipment status, setting, state or condition.

4. The cellular base station communication system of claim 3 wherein said data represents beam tilt angle.

5. The cellular base station communication system of claim 2 wherein said controller is configured to display a predetermined base station equipment status, setting, state or condition.

6. The cellular base station communication system of claim 5 wherein said status, setting, state or condition represents beam tilt angle.

7. The cellular base station telecommunication system of claim 2 wherein said status, setting, state or condition concerns an antenna fault.

8. The cellular base station telecommunication system of claim 2 wherein said status, setting, state or condition concerns a physical position of an element in an electromechanical device.

9. The cellular base station telecommunication system of claim 8 wherein said electromechanical device comprises an electrical actuator coupled to a phase shifter.

10. The cellular base station telecommunication system of claim 2 wherein said status, setting, state or condition concerns an electrical circuit parameter.

11. The cellular base station telecommunication system of claim 10 wherein said electrical parameter comprises a state of a switch.

12. The cellular base station telecommunication system of claim 2 wherein said status, setting, state or condition is related to antenna status or a beam downtilt parameter.

13. The cellular base station telecommunication system of claim 2 wherein said beam downtilt parameter comprises tilt angle.

14. The cellular base station communication system of claim 2 wherein each of said first and second local controllers has a serial line connection adapted to receive commands from said central controller.

15. A cellular base station telecommunication system comprising:

a. at a first site, a first cellular base station comprising a first group of base station antennas controlled by a first local controller, each antenna having two or more radiating elements and an electromechanical structure responsive to externally supplied control signals and configured to effect relative movement of components of one or more phase shifting elements to vary the phase of signals supplied to the respective radiating elements to vary a direction of a beam of the antenna;

b. at a second site, a second cellular base station comprising a second group of base station antennas controlled by a second local controller; each antenna having two or more radiating elements and an electromechanical structure responsive to externally supplied control signals and configured to effect relative movement of components of one or more phase shifting elements to vary the phase of signals supplied to the respective radiating elements to vary a direction of a beam of the antenna; and c. a central controller communicating with said first and second local controllers and configured to enable, select, set, or change a predetermined base station equipment function, status, setting state or condition.

16. The cellular base station telecommunication system of claim 15 wherein said central controller is configured to select, set, or change a beam parameter.

17. The cellular base station telecommunication system of claim 15 wherein said central controller is configured to select, set, or change a beam downtilt angle.

18. The cellular base station telecommunication system of claim 15 wherein said central controller is configured to enable or disable one or more of said antennas.

* * * * *